US010086487B2

(12) United States Patent
Itou

(10) Patent No.: US 10,086,487 B2
(45) Date of Patent: Oct. 2, 2018

(54) INTERNAL CLEANING DEVICE OF MACHINE TOOL

(71) Applicant: FANUC Corporation, Minamitsuru-gun, Yamanashi (JP)

(72) Inventor: Masanori Itou, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 282 days.

(21) Appl. No.: 14/969,082

(22) Filed: Dec. 15, 2015

(65) Prior Publication Data

US 2016/0184947 A1   Jun. 30, 2016

(30) Foreign Application Priority Data

Dec. 25, 2014   (JP) .................................. 2014-263099
Nov. 27, 2015   (JP) .................................. 2015-231629

(51) Int. Cl.
*B23Q 11/00*       (2006.01)
*B08B 15/00*       (2006.01)
*B23Q 17/24*       (2006.01)

(52) U.S. Cl.
CPC .......... *B23Q 11/0046* (2013.01); *B08B 15/00* (2013.01); *B23Q 17/2409* (2013.01); *B23Q 11/005* (2013.01)

(58) Field of Classification Search
CPC ............ B23Q 11/0046; B23Q 17/2409; B23Q 11/005; B23Q 11/00; B08B 11/005
See application file for complete search history.

(56) References Cited

U.S. PATENT DOCUMENTS

2010/0293739 A1* 11/2010 Imamura .............. B23Q 11/005
                                                      15/319
2011/0265835 A1   11/2011 Sato
2013/0327159 A1* 12/2013 Russell .................... G01N 1/02
                                                      73/863.01

(Continued)

FOREIGN PATENT DOCUMENTS

JP       S61-20247 U      2/1986
JP       H07-108435 A     4/1995

(Continued)

OTHER PUBLICATIONS

Decision of Refusal dated Jul. 19, 2016 in Japanese Patent Application No. 2015-231629 (3 pages) with an English Translation (3 pages).

(Continued)

*Primary Examiner* — David Redding
(74) *Attorney, Agent, or Firm* — Drinker Biddle & Reath LLP

(57) ABSTRACT

An internal cleaning device of a machine tool includes: a chip removing device that removes chips; a moving device that is capable of holding the chip removing device; a detecting device that detects the buildup status of chips in the machine tool; an information processing device that processes information related to the chip buildup status obtained by the detecting device and determines a spot requiring a removal of chips; and a control device of the moving device that moves the chip removing device to the spot on which a determination has been made by the information processing device that the spot requires a removal of chips.

11 Claims, 4 Drawing Sheets

(56) References Cited

U.S. PATENT DOCUMENTS

2014/0286734 A1    9/2014   Oda

FOREIGN PATENT DOCUMENTS

| | | |
|---|---|---|
| JP | H07-256550 A | 10/1995 |
| JP | 2000-218464 A | 8/2000 |
| JP | 2001-009388 A | 1/2001 |
| JP | 2001-322049 A | 11/2001 |
| JP | 2009-113182 A | 5/2009 |
| JP | 2010-158726 A | 7/2010 |
| JP | 2011-073084 A | 4/2011 |
| JP | 2014-205231 A | 10/2014 |
| JP | 2015-024454 A | 2/2015 |

OTHER PUBLICATIONS

Notification of Reasons for Refusal dated Nov. 21, 2017 in Japanese Patent Application No. 2015-231629 (7 pages) with English translation (8 pages).
Notification of Reasons for Refusal dated Mar. 29, 2016 in corresponding Japanese Application No. 2015-231629.

* cited by examiner

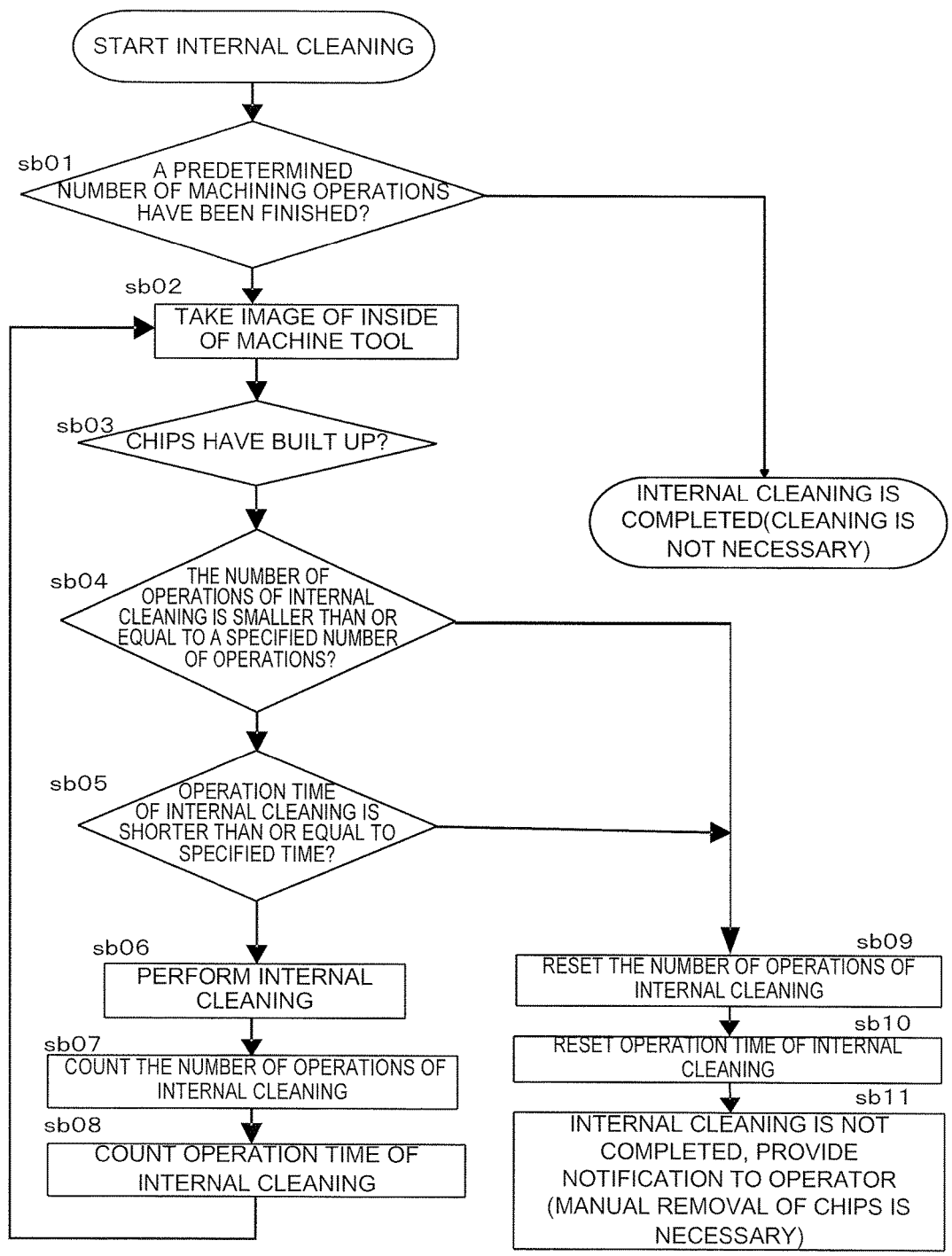

INTERNAL CLEANING DEVICE OF MACHINE TOOL

RELATED APPLICATION DATA

This application claims priority under 35 U.S.C. § 119 and/or § 365 to Japanese Application No. 2014-263099 filed Dec. 25, 2014, and Japanese Application No. 2015-231629 filed Nov. 27, 2015, the entire contents are incorporated herein by reference.

BACKGROUND OF THE INVENTION

1. Field of the Invention

The present invention relates to an internal cleaning device of a machine tool, the internal cleaning device using a robot and a detecting device.

2. Description of the Related Art

In a machine tool, if chips generated during machining build up in the machine tool, the chips may be caught in a moving part, for example, and various failures may be caused thereby. As one of the chip removing units, a chip removing unit that is provided with a nozzle with a snake pipe and discharges chips to the outside of the machine tool by a cutting fluid during machining is known. However, since the range in which the nozzle can be moved is restricted, it is difficult to clean a chip buildup spot accurately and regular manual internal cleaning is required.

On the other hand, a system that attaches a cleaning device to a robot or the like and controls the position and the location of the cleaning device is proposed. In these prior art techniques, by moving the cleaning device in the machine tool, it is possible to perform a removal of chips in a wide area in the machine tool.

In Japanese Patent Application Laid-Open No. 2009-113182, an automatic cleaning device of a machine tool, the automatic cleaning device allowing an air nozzle removing the chips and cutting oil scattered at the time of machining of work to the outside of the machine tool by an air blow to move independently of the movement of a spindle head and relative to the work in orthogonal three axial directions, is disclosed.

In Japanese Patent Application Laid-Open No. 2001-322049, a device that provides a cleaning robot having an arm with a nozzle sucking in chips at the tip thereof in a movable body such as a cross rail or a spindle head of a machine tool, designs a movement path over which the nozzle can move and suck in the chips within a time which is determined by a machining program used when a tool machines work, and sucks in and discharges the chips by controlling the cleaning robot by outputting only the path data on an interference region from which a region in which interference with the tool performing machining occurs is removed is disclosed.

These cleaning robots described above each operate in accordance with the preset program, and no consideration is given to the actual chip buildup status. Therefore, cleaning may be performed more than necessary or machining proceeds to the next stage in a state in which there are still chips left.

SUMMARY OF THE INVENTION

An object of the present invention is accordingly to provide an internal cleaning device of a machine tool, the internal cleaning device using a robot and a detecting device and being capable of performing internal cleaning by determining a spot requiring cleaning based on the chip buildup status by using the detecting device that detects the buildup state of chips in the machine tool.

An internal cleaning device of a machine tool according to the present invention is an internal cleaning device of a machine tool with a cover separating the inside of the machine tool, which is a machining space, from the outside, the internal cleaning device removing chips built up inside the cover. The internal cleaning device includes: a chip removing device that removes the chips; a moving device that is capable of holding the chip removing device; a detecting device that detects a chip buildup status in the machine tool; an information processing device that processes information related to the chip buildup status obtained by the detecting device and determines a spot requiring a removal of chips; and a control device of the moving device that moves the chip removing device to the spot on which a determination has been made by the information processing device that the spot requires a removal of chips.

The internal cleaning device of the machine tool may be configured such that, after removing the chips by the chip removing device, the internal cleaning device detects a chip buildup status in the machine tool by the detecting device and repeatedly executes a removal of chips until the information processing device determines that the chips are removed.

In the repeated execution of a removal of chips, the chip removing device may be made to operate in a manner different from the previous execution.

The chip removing device may remove the chips by spraying a fluid.

The chip removing device may remove the chips by sucking in the chips with a fluid.

The moving device may be a robot.

The detecting device may be a visual sensor.

The detecting device may be a distance sensor.

The detecting device may be attached to the moving device.

The information processing device may be built into the control device of the moving device.

In the internal cleaning device of the machine tool, marks or patterns may be provided in the machine tool and the information processing device may determine a spot in which recognition of the marks or the patterns is impossible after machining to be a spot requiring cleaning.

The internal cleaning device of the machine tool may determine whether a removal of chips is performed by the chip removing device or a manual removal of chips is performed and provide a notification of the necessity of a manual removal of chips if the internal cleaning device determines that a manual removal of chips is necessary.

With the above configuration, the present invention can provide an internal cleaning device of a machine tool, the internal cleaning device being capable of performing internal cleaning by determining a spot requiring cleaning based on the chip buildup status by using a detecting device that detects the buildup state of chips in the machine tool.

BRIEF DESCRIPTION OF THE DRAWINGS

These and other objects and features of the present invention will become apparent from the following description of exemplary embodiments with reference to the accompanying drawings in which:

FIG. 4 is a diagram depicting another flow of the processing which is performed by the internal cleaning device of the machine tool, the internal cleaning device using the robot and the detecting device that detects the buildup state of chips in the machine tool.

DETAILED DESCRIPTION OF THE PREFERRED EMBODIMENTS

Figure 1:
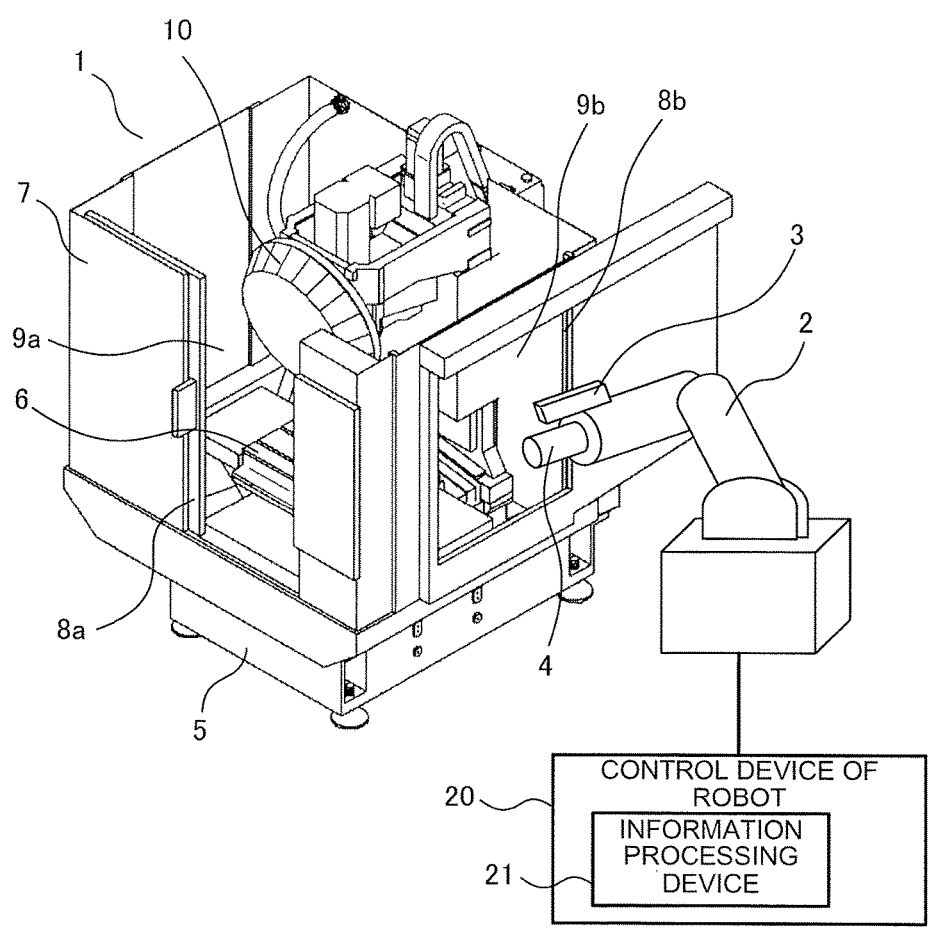
FIG. 1 is a diagram depicting an internal cleaning device of a machine tool, the internal cleaning device using a robot and a detecting device that detects the buildup state of chips in the machine tool.

FIG. 1 is a diagram depicting an internal cleaning device of a machine tool, the internal cleaning device using a robot and a detecting device. The internal cleaning device of the machine tool is formed of a machine tool 1, a robot 2 placed outside the machine tool 1, a chip removing device, such as a coolant gun 4, which is attached to the robot 2, a detecting device, such as a visual sensor 3, which is attached to the robot 2 which is a moving device, and an information processing device 21 installed in the robot 2.

The machine tool 1 includes, on a bed 5, a splash guard 7 which separates the inside of the machine tool, which is a machining space, from the outside and thereby prevents a machining fluid and chips generated by machining of work from being scattered to the outside from the inside of the machine tool. The splash guard 7 has openings 9a and 9b provided therein, and, to the openings 9a and 9b, openable and closable opening and closing doors 8a and 8b are respectively attached. In the machine tool, a table 6 on which work (not depicted in the drawing) is placed and a tool exchanging device 10 that replaces a tool with another are disposed. The machine tool 1 machines the work by being controlled by a control device (not depicted in the drawing) of the machine tool 1.

The robot 2 is a robot with a jointed arm which is controlled by a control device 20 of the robot 2, and has the coolant gun 4 attached to the tip of the arm. The control device 20 of the robot 2 includes the information processing device 21.

The robot 2 checks the chip buildup status by using the detecting device, such as the visual sensor 3, which is attached to the robot 2 by inserting the tip of the arm into the machine tool through the opening 9b during a period in which the machine tool 1 does not perform machining of the work, cleans the chips built up in the machine tool by spraying a cutting fluid which is used to machine the work, that is, a coolant on the built-up chips from the coolant gun 4 attached to the tip of the arm, and discharges the chips to the outside of the machine tool. The information processing device 21 processes the information related to the chip buildup status detected by the detecting device such as the visual sensor 3 and performs processing for determining a spot requiring a removal of chips. Incidentally, the information processing device 21 may be built into the control device 20 of the robot 2 or may be provided independently of the control device 20 of the robot 2.

Figure 2:
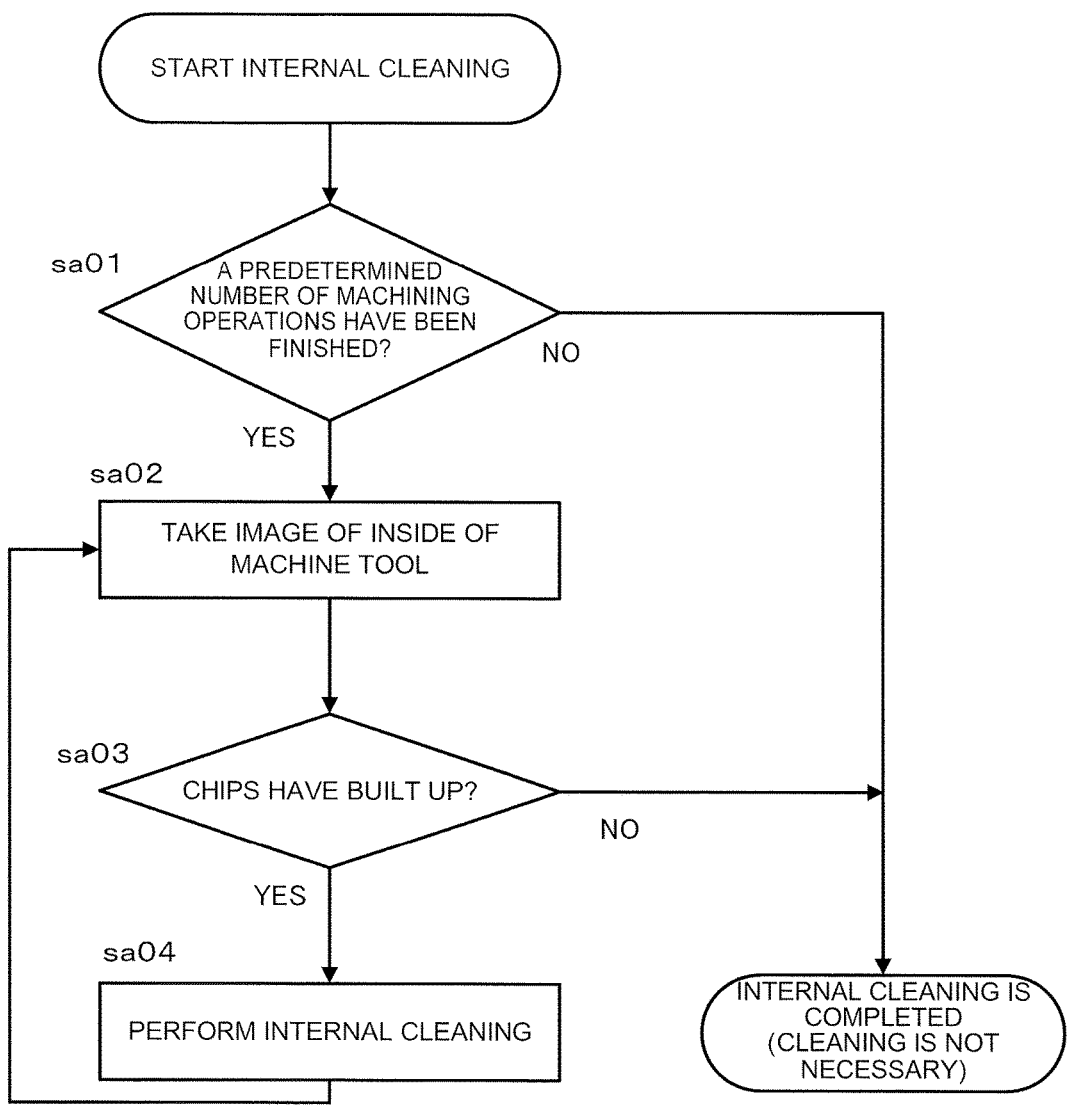
FIG. 2 is a diagram depicting a flow of processing which is performed by the internal cleaning device of the machine tool, the internal cleaning device using the robot and the detecting device that detects the buildup state of chips in the machine tool.

FIG. 2 is a diagram depicting a flow of processing which is performed by the internal cleaning device of the machine tool, the internal cleaning device using the robot and the detecting device that detects the buildup state of chips in the machine tool. After machining of the work by the machine tool is finished, the robot is inserted into the machine tool and the state of the inside of the machine tool is obtained by the detecting device, and the information thus obtained is processed by the information processing device, whereby a determination of a spot requiring cleaning is made.

Hereinafter, a description will be given in accordance with each step.

[Step sa01] A determination as to whether or not a predetermined number of machining operations have been finished is made. If a predetermined number of machining operations have been finished (YES), the procedure proceeds to Step sa02; if a predetermined number of machining operations have not been finished (NO), it is determined that cleaning is not necessary and internal cleaning is completed.

[Step sa02] An image of the inside of the machine tool is taken.

[Step sa03] A determination as to whether or not chips have built up in the machine tool is made. If chips have built up in the machine tool (YES), the procedure proceeds to Step sa04; if chips have not built up in the machine tool (NO), it is determined that cleaning is not necessary and internal cleaning is completed.

[Step sa04] Internal cleaning is performed to remove the chips from the inside of the machine tool, and the procedure goes back to Step sa02.

Here, an example of a method for determining a spot requiring cleaning by using the detecting device that detects the buildup state of chips in the machine tool will be described.

(1) A Method Which Uses a Template Image

The visual sensor 3 is used as the detecting device. The visual sensor 3 takes an image of the work in the machine tool, the table 6, and the bottom of the splash guard 7. Here, the image taken in a state in which chips do not build up is stored as a template and is compared with the image taken after machining of the work. In a chip buildup spot, the luminance of the image is different from the luminance of the template image. Thus, a spot in which a luminance difference between the image taken after machining of the work and the template image is greater than or equal to a preset threshold value is determined to be a spot requiring cleaning.

(2) A Method Which Provides Marks in The Machine Tool

Figure 3:
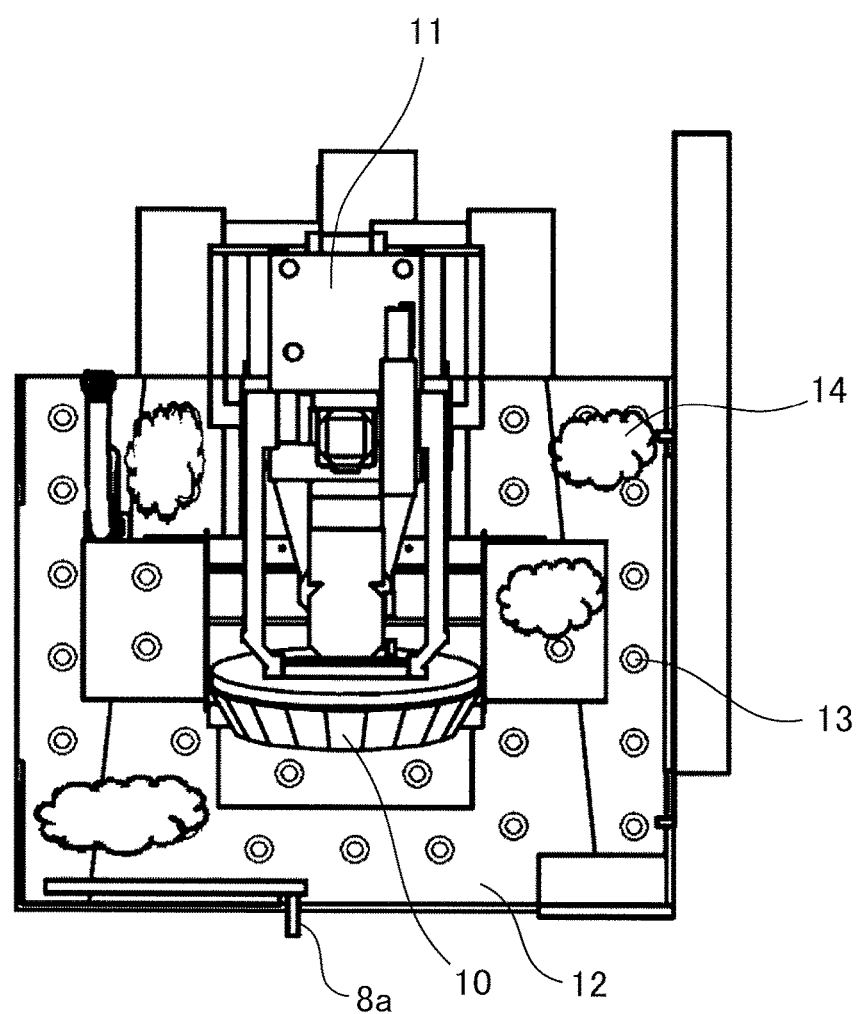
FIG. 3 is a diagram depicting an example of placement of marks.

The visual sensor 3 is used as the detecting device. FIG. 3 is a diagram depicting an example of placement of marks. Specific marks 13 or patterns (not depicted in the drawing) are provided in the machine tool, and a spot in which recognition of the marks 13 or patterns becomes impossible after machining is determined to be a spot requiring cleaning. In FIG. 3, the marks 13 are provided on a bottom face 12 of the splash guard 7.

(3) A Method Which Uses Depth Information

A distance sensor is used as the detecting device. The distance sensor is a device which measures a depth to an object, and, as a common method, there is a distance image sensor that irradiates an object with infrared radiation or laser light and calculates the distance based on the time required for the light to reach the object and return from the object. The depth information of the inside of the machine tool without built-up chips is compared with the depth information obtained after machining. A spot in which a change greater than or equal to a threshold value has been observed in the depth is determined to be a spot requiring cleaning.

The chip removing unit such as the coolant gun 4 is moved to the spot requiring cleaning by using the robot 2 and a removal of the chips is performed. The state of the inside of the machine tool is obtained again and a determination of a spot requiring cleaning is made again by using the detecting device such as the visual sensor 3 or the distance image sensor, and it is checked whether or not the chips have been properly removed. If the luminance difference between the image taken in a state without built-up chips and the image obtained after cleaning is greater than or equal to the threshold value even after cleaning, it is determined that cleaning has been inadequately performed, and cleaning is performed again. The above process is repeatedly performed until the luminance difference becomes smaller than or equal to the threshold value and it is determined that the chips have been removed. In the repeated execution of a removal of chips, the chip removing device may be made to operate in a different manner in each execution. For example, the injection pressure of a fluid to be sprayed may be changed, the injection pressure of the fluid to be sprayed may be varied, or the direction in which the fluid is sprayed toward the chip buildup spot may be changed. Moreover, the suction pressure of a fluid to be sucked in may be changed, the suction pressure of the fluid to be sucked in may be varied, or the direction in which the fluid is sucked in from the chip buildup spot may be changed. Incidentally, as the fluid to be sprayed, in addition to a cleaning fluid, the cutting fluid, compressed air, a mixture thereof, or the like is used. Furthermore, the fluid to be sucked in includes the cutting fluid or the like in addition to air.

After it is determined that the chips have been removed, the procedure proceeds to the next process.

Depending on the chip buildup spot, a manual removal of chips is sometimes finished earlier than a removal performed by the robot. If repeated operations whose number and time are more than or equal to a specified number and time are performed, a determination may be made that a manual removal of chips should be performed and an operator may be notified of a buildup of chips. A region about which a notification has been provided to the operator may be stored or the operator may register in advance a spot to be manually cleaned, and, if it is determined by the detecting device that chips have built up in that region, a notification may be provided to the operator in advance to eliminate the time of cleaning performed by the chip removing unit. In any one of these cases, the machine tool proceeds to the next process after the chips are removed by the operator. Moreover, a removal of chips by the operator may be performed during the day, and switching to cleaning by the chip removing device may be performed in the middle of the night, for example, in which no operator attends the machine tool. Incidentally, as a notifying unit, a unit that provides only a notification of a buildup by using a rotating warning light or the like or a unit that provides also a notification of a buildup spot by, for example, indicating the spot graphically or displaying a number assigned to each region can be used.

FIG. 4 is a diagram depicting another flow of the processing which is performed by the internal cleaning device of the machine tool, the internal cleaning device using the robot and the detecting device that detects the buildup state of chips in the machine tool. After machining of the work performed by the machine tool is finished, the robot is inserted into the machine tool, the state of the inside of the machine tool is obtained by the detecting device, the information thus obtained is processed by the information processing device, and a determination of a spot requiring cleaning is made. Furthermore, if chips have built up and a specified number of operations of internal cleaning have been performed for a specified time, the notifying unit notifies the operator of a buildup of chips.

Hereinafter, a description will be given in accordance with each step.

[Step sb01] A determination as to whether or not a predetermined number of machining operations have been finished is made. If a predetermined number of machining operations have been finished (YES), the procedure proceeds to Step sb02; if a predetermined number of machining operations have not been finished (NO), it is determined that cleaning is not necessary and internal cleaning is completed.

[Step sb02] An image of the inside of the machine tool is taken.

[Step sb03] A determination as to whether or not chips have built up in the machine tool is made. If chips have built up in the machine tool (YES), the procedure proceeds to. Step sb04; if chips have not built up in the machine tool (NO), it is determined that cleaning is not necessary and internal cleaning is completed.

[Step sb04] A determination as to whether or not the number of operations of internal cleaning is smaller than or equal to a specified number of operations is made. If the number of operations of internal cleaning is smaller than or equal to a specified number of operations (YES), the procedure proceeds to Step sb05; if the number of operations of internal cleaning is greater than a specified number of operations (NO), the procedure proceeds to Step sb09.

[Step sb05] If the operation time of internal cleaning is shorter than or equal to a specified time (YES), the procedure proceeds to Step sb06; if the operation time of internal cleaning is longer than a specified time (NO), the procedure proceeds to Step sb09.

[Step sb06] Internal cleaning is performed to remove chips from the inside of the machine tool, and the procedure proceeds to Step sb07.

[Step sb07] The number of operations of the internal cleaning performed in Step sb06 is counted, and the procedure proceeds to Step sb08.

[Step sb08] The operation time of the internal cleaning performed in Step sb06 is counted, and the procedure goes back to Step sb02.

[Step sb09] The number of operations of internal cleaning is reset to an initial value.

[Step sb10] The operation time of internal cleaning is reset to an initial value.

[Step sb11] An operator is notified that the internal cleaning is not completed. That is, the operator is notified of the necessity for a manual removal of chips.

Incidentally, taking of an image of the inside of the machine tool performed by the visual sensor 3 and internal cleaning are not necessarily performed after each machining. Taking of an image of the inside of the machine tool performed by the visual sensor 3 and internal cleaning are performed after a preset number of machining operations are performed in order to reduce the cleaning time by not operating the cleaning device if it is clear that the number of built-up chips is small and there is no need for cleaning.

In FIG. 1, the machine tool 1 provided with a splash guard 7 is depicted, but the present invention can also be applied to a machine tool without a splash guard. Moreover, in FIG. 1, the robot 2 is depicted as an example of the moving device and the robot 2 is placed outside the machine tool 1 provided with the splash guard 7, but the moving device can also be placed in the machine tool 1 provided with the splash guard 7. The present invention can also be applied to a removal of chips built up on the table. Furthermore, as the chip removing device, in addition to a coolant gun that sprays a fluid and a suction nozzle that sucks in a fluid, a unit that does not use a fluid, such as a brush, a wiper, or the use of part of a housing of the moving device, may be used.

The invention claimed is:

1. An internal cleaning device of a machine tool with a cover separating an inside of the machine tool, which is a machining space, from an outside of the machine tool, the internal cleaning device that removes chips built up inside the cover, the internal cleaning device comprising:
    a chip removing device that removes the chips;
    a moving device that holds and moves the chip removing device;
    a detecting device, attached to an end of the moving device and moved by the moving device, that detects a chip buildup status in the machine tool;
    an information processing device that processes information related to the chip buildup status detected by the detecting device and determines a spot requiring a removal of chips; and
    a control device of the moving device that moves the chip removing device to the spot on which a determination has been made by the information processing device that the spot requires the removal of chips.

2. The internal cleaning device of the machine tool according to claim 1, wherein, after the removal of chips by the chip removing device, the internal cleaning device detects a new chip buildup status in the machine tool by the detecting device and repeatedly executes the removal of chips until the information processing device determines that the chips are removed.

3. The internal cleaning device of the machine tool according to claim 2, wherein in the repeated execution of a removal of chips, the control device is programmed to direct the chip removing device to operate in a manner different from a previous execution.

4. The internal cleaning device of the machine tool according to claim 1, wherein the chip removing device removes the chips by spraying a fluid.

5. The internal cleaning device of the machine tool according to claim 1, wherein the chip removing device removes the chips by sucking in the chips with a fluid.

6. The internal cleaning device of the machine tool according to claim 1, wherein the moving device is a robot.

7. The internal cleaning device of the machine tool according to claim 1, wherein the detecting device is a visual sensor.

8. The internal cleaning device of the machine tool according to claim 1, wherein the detecting is a distance sensor.

9. The internal cleaning device of the machine tool according to claim 1, wherein the information processing device is built into the control device of the moving device.

10. The internal cleaning device of the machine tool according to claim 1, wherein marks or patterns are provided in the machine tool, and the information processing device determines a spot in which recognition of the marks or the patterns is impossible after machining to be a spot requiring cleaning.

11. The internal cleaning device of the machine tool according to claim 1, further comprising:
    a unit that determines whether a removal of chips is performed by the chip removing device or a manual removal of chips is performed and provides a notification of a necessity of a manual removal of chips if the unit determines that a manual removal of chips is necessary.

* * * * *